US010625681B2

(12) United States Patent
Liu et al.

(10) Patent No.: US 10,625,681 B2
(45) Date of Patent: Apr. 21, 2020

(54) DOWNSTOP FOR GLOVEBOX

(71) Applicant: Ford Global Technologies, LLC, Dearborn, MI (US)

(72) Inventors: Frank Qiukui Liu, Canton, MI (US); David L. Cousino, Carleton, MI (US); Francis Raymond Gillis, Framington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/972,482

(22) Filed: May 7, 2018

(65) Prior Publication Data

US 2019/0337459 A1    Nov. 7, 2019

(51) Int. Cl.
*B60R 7/00* (2006.01)
*B60R 7/06* (2006.01)
*E05F 5/06* (2006.01)

(52) U.S. Cl.
CPC . *B60R 7/06* (2013.01); *E05F 5/06* (2013.01)

(58) Field of Classification Search
CPC ............. F16K 31/1262; F16K 31/1221; F16K 31/1268; F16K 31/145; F16K 41/04; B65F 1/1615; Y10T 29/49826; B60R 7/06
See application file for complete search history.

(56) References Cited

U.S. PATENT DOCUMENTS

| 3,386,765 A | * | 6/1968 | Drach, Jr. | E05B 83/30 |
| | | | | 296/37.12 |
| 5,190,314 A | * | 3/1993 | Takasugi | B60R 7/06 |
| | | | | 280/730.1 |
| 5,197,775 A | * | 3/1993 | Reeber | B60R 7/06 |
| | | | | 296/37.12 |
| 5,385,378 A | | 1/1995 | Hakamada et al. | |
| 5,845,954 A | | 12/1998 | DePue | |
| 5,904,389 A | * | 5/1999 | Vaishnav | B60R 7/06 |
| | | | | 208/208 R |
| 6,076,878 A | | 6/2000 | Isano | |
| 6,899,364 B2 | | 5/2005 | Park et al. | |
| 6,945,579 B2 | | 9/2005 | Peck, Jr. et al. | |
| 7,168,130 B2 | | 1/2007 | Shin | |
| 8,403,392 B2 | | 3/2013 | Okimoto | |
| 9,630,564 B1 | * | 4/2017 | Cano | B60R 7/04 |
| 9,637,061 B2 | | 5/2017 | Mazzocchi et al. | |
| 2014/0175824 A1 | * | 6/2014 | Park | B60R 7/06 |
| | | | | 296/37.12 |
| 2017/0078776 A1 | * | 3/2017 | Kaplan | H04R 1/025 |
| 2018/0086274 A1 | | 3/2018 | Roychoudhury | |
| 2018/0251075 A1 | * | 9/2018 | Harima | E05B 83/30 |
| 2018/0283064 A1 | * | 10/2018 | Liu | B60R 7/06 |
| 2019/0001897 A1 | * | 1/2019 | Thomas | B60R 7/06 |
| 2019/0084488 A1 | * | 3/2019 | Glass, II | B62D 65/14 |

FOREIGN PATENT DOCUMENTS

RU          23596 U1     6/2002

* cited by examiner

*Primary Examiner* — Kiran B Patel
(74) *Attorney, Agent, or Firm* — David Coppiellie; Price Heneveld LLP

(57) ABSTRACT

A vehicle glovebox includes a bin rotationally operable within a housing. A downstop is defined within the housing. The downstop is in a blocking position and engages the bin to define a fully open position of the bin. The downstop is operable to a release position that defines rotation of the bin beyond the fully open position.

14 Claims, 10 Drawing Sheets

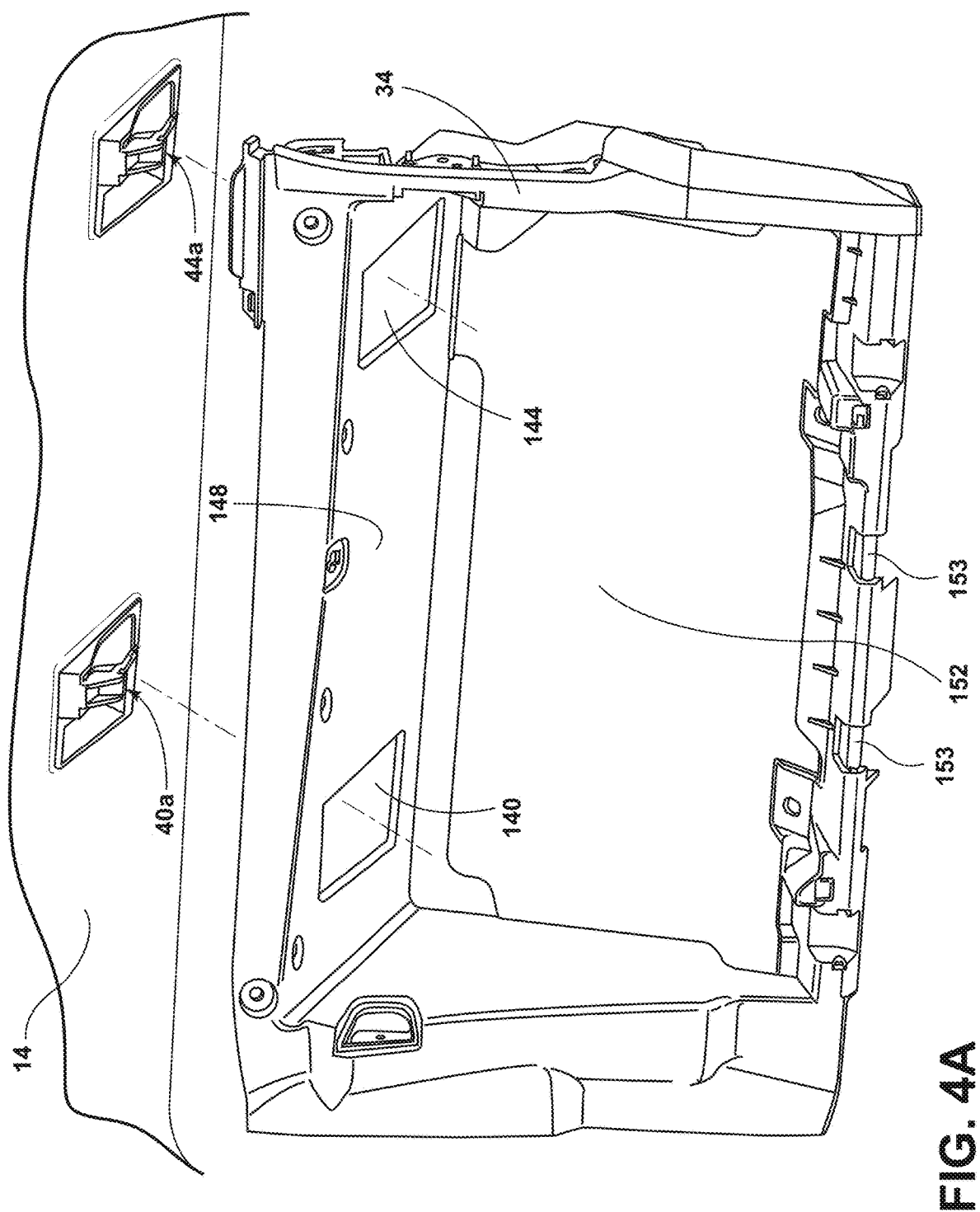

DOWNSTOP FOR GLOVEBOX

FIELD OF THE DISCLOSURE

The present disclosure generally relates to storage containers disposed within the passenger cabin of a vehicle and more specifically, a glovebox having a downstop for performing rotation limiting and release functions.

BACKGROUND OF THE DISCLOSURE

Automobiles typically include interior storage compartments, such as a glovebox mounted within a dashboard of a vehicle. These compartments are typically rotationally operable from within the dashboard, so that the user can access and close the compartment as needed.

SUMMARY OF THE DISCLOSURE

According to one aspect of the present disclosure, a vehicle glovebox includes a bin rotationally operable within a housing. A downstop is defined within the housing. The downstop is in a blocking position and engages the bin to define a fully open position of the bin. The downstop is operable to a release position that defines rotation of the bin beyond the fully open position.

Embodiments of the first aspect of the disclosure can include any one or a combination of the following features:
  the housing comprises a frame and wherein the downstop is attached to the frame;
  the downstop comprises a first flange and a second flange and wherein the second flange is transverse to the first flange;
  a reinforced position of the downstop is defined by an outward deflection of the first flange of the downstop of a first distance from the blocking position and a downward deflection of the second flange of the downstop of a second distance from the blocking position;
  the release position of the downstop is defined by an inward deflection of the downstop of a third distance from the blocking position;
  the reinforcing position of the bin is defined by a downward force applied to the bin when the bin is in the fully open position;
  the frame includes a brace, the second flange includes an interlock feature, and the brace supports the interlock feature in the reinforced position and limits the outward deflection of the first flange to the first distance;
  the first flange engages a back wall of the bin in the blocking position when the bin is in the fully open position and wherein when the bin is in the reinforcing position the first flange engages the bin and the interlock feature of the second flange engages the brace;
  a back wall of the bin engages a rear surface of the first flange in the fully open position and the reinforcing position and wherein a bottom surface of the interlock feature engages the brace in the reinforcing position;
  the downstop is moved to the reinforcing position upon application of a first force upon the downstop and in a direction substantially normal to and toward a rear surface of the first flange, the first force having a first magnitude, and wherein the downstop is moved to the release position upon application of a second force upon a front surface of the first flange and in a direction generally opposed to the first force and toward an interior of the frame, wherein the second force has a second magnitude, wherein the first magnitude is greater than the second magnitude;
  the first flange is a substantially rigid member that rotates about a first living hinge and wherein the second flange is a substantially rigid member that rotates around a second living hinge;
  the second living hinge is disposed proximate a ceiling of the frame;
  a ridge extends from the first flange to the second flange; and/or
  when the downstop is in the release position, the first flange is at least partially disposed within the interior of the frame and the bin is adapted to bypass the frame to define a removal position of the bin, wherein the bin is removable from the frame in the removal position.

According to another aspect of the present disclosure, a vehicle includes a housing disposed within a dashboard. A bin is rotationally operable within the housing. A downstop is integral to the housing and protrudes into the bin. The downstop is operable between a blocking position that engages the bin in a fully open position, a release position wherein the bin is selectively removable from the housing, and a reinforced position wherein a first flange of the downstop operably engages the bin and a second flange of the downstop operably engages a brace of the housing for limiting over rotation of the bin.

Embodiments of the second aspect of the disclosure can include any one or a combination of the following features:
  the housing comprises a frame and wherein the downstop is integral to the frame; and/or
  the reinforced position of the downstop is defined by an outward deflection of the first flange of a first distance from the blocking position and a downward deflection of the second flange of a second distance from the blocking position, wherein the release position of the downstop is defined by an inward deflection of the first flange of a third distance from the blocking position, and wherein the third distance from the blocking position is greater than the first distance from the blocking position.

According to yet another aspect of the present disclosure, a glovebox includes a housing. A bin includes an interior. A downstop protrudes from the housing into the interior. The bin is rotationally coupled to the housing. The downstop includes a first flange and a second flange. The first flange is selectively and alternatively positionable in release, blocking, and reinforced positions relative to the bin. The second flange is selectively and alternatively positionable in a release, blocking, and reinforced position relative to a brace of the housing.

Embodiments of the third aspect of the disclosure can include any one or a combination of the following features:
  the housing comprises a frame including the downstop and the brace; and/or
  the frame, the downstop, and the brace are an integrally molded part.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4A is a perspective view of a frame of a glovebox and a dashboard with the downstops integral to the dashboard;

DETAILED DESCRIPTION

For purposes of description herein, the terms "upper," "lower," "right," "left," "rear," "front," "vertical," "horizontal," "interior," "exterior," and derivatives thereof shall relate to the invention as oriented in FIGS. 1-13. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
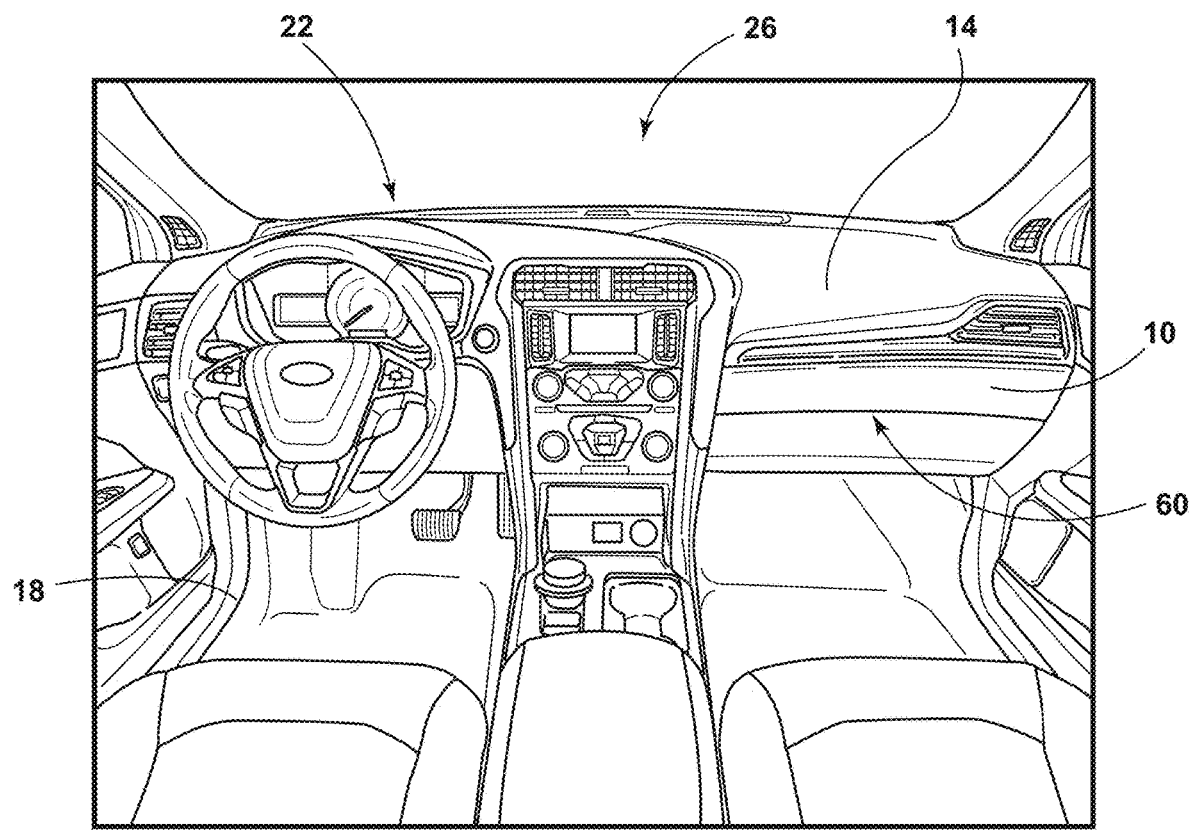
FIG. 1 is a perspective view of a dashboard disposed within a passenger compartment of a vehicle and showing the glovebox in a closed position.
Figure 2:
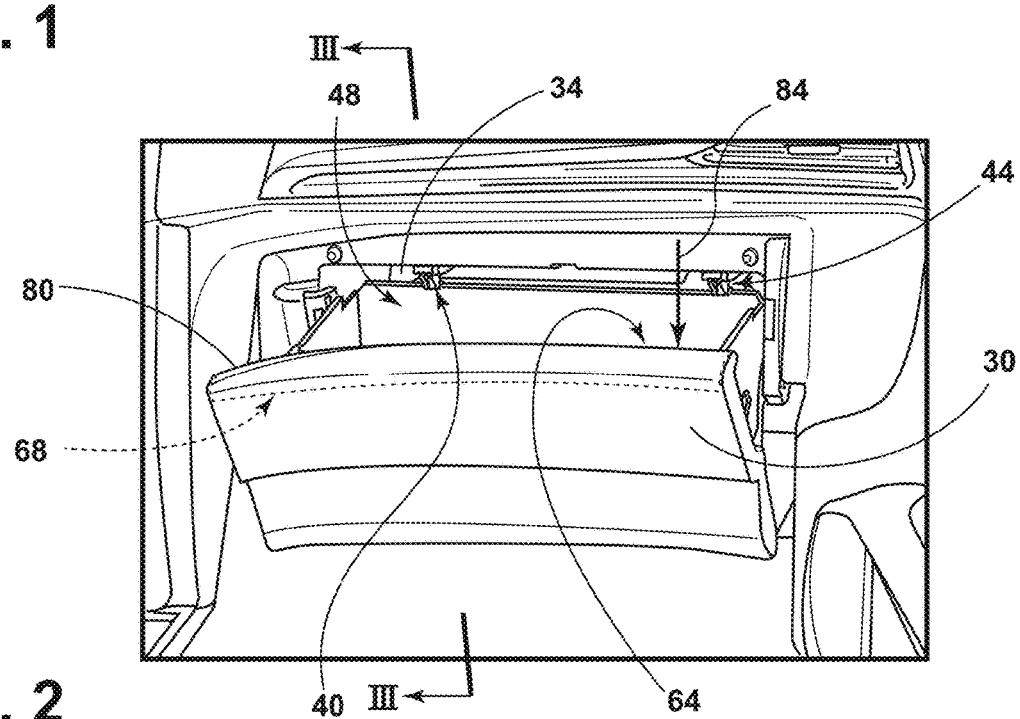
FIG. 2 is an enlarged perspective view of a glovebox shown in a fully open position.

As shown in FIGS. 1-2, a glovebox assembly 10 is typically disposed within a dashboard 14 set within a front area 18 of the passenger compartment 22 of a vehicle 26. According to various aspects, the glovebox assembly 10 can include a bin 30 that is rotationally operable within a frame 34. The bin 30 may be a container having an interior that can be used for storing various items within the dashboard 14 of the vehicle 26. One or more downstops (first downstop 40 and second downstop 44) may extend into the bin 30. The first and second downstops 40, 44 may extend from a housing. According to one aspect, the housing may be a portion of the dashboard 14 near the frame 34. According to another aspect, the housing may be integral with the frame 34. An interlock system 48 is typically disposed within a glovebox assembly 10 wherein the interlock system 48 supports the operability of the glovebox assembly 10. The bin 30 is shown in the closed position 60 in FIG. 1. The bin 30 is shown in the fully open position 64 and the reinforcing position 68 in FIG. 2. When an excessive load is applied to a front edge of the forward wall 80 of the bin 30, then the forward wall 80 of the bin 30 moves beyond the fully open position 64 to the reinforcing position 68. The excessive load is shown by arrow 84, which represents a downward force. The exact location of the reinforcing position 68 of the bin 30 can be dependent on the magnitude of the downward force shown by arrow 84.

Figure 3:
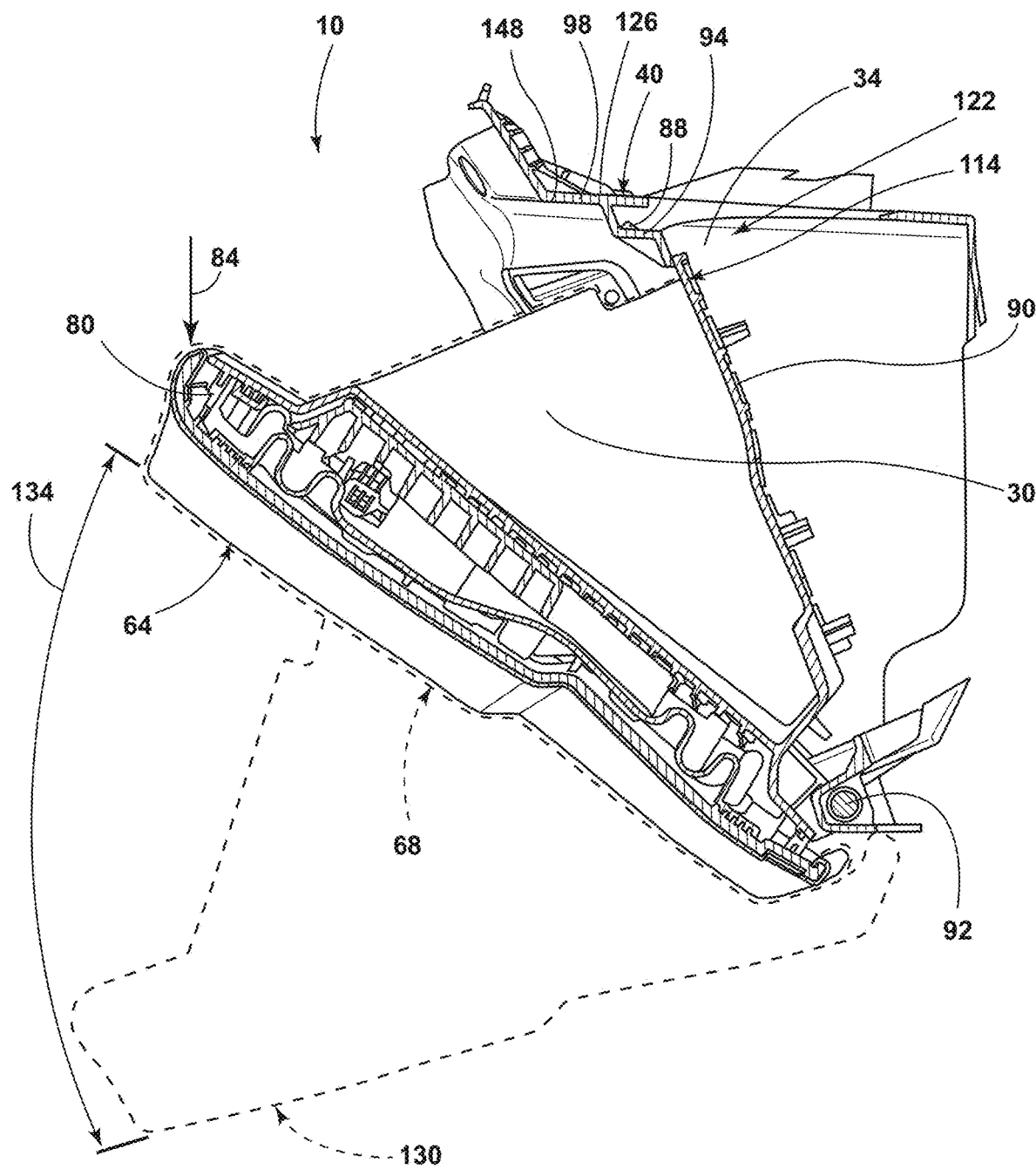
FIG. 3 is a cross-sectional view of a glovebox assembly of a vehicle taken along line III-III in FIG. 2 and showing the glovebox in a fully open position.

Referring to FIGS. 1-3, when the bin 30 is in the fully open position 64, passengers may inadvertently exert an excessive load (force arrow 84) on a forward wall 80 or other portion of the glove box bin 30. The excessive load (force arrow 84) moves the forward wall 80 of the bin 30 to the reinforcing position 68 which is beyond the fully open position 64. The excessive load is sometimes referred to as a customer abuse load. As a first example of an exertion of an excessive load on a forward wall 80 of the glove box bin 30, a passenger might inadvertently lean on the forward wall 80 of the bin 30 in the fully open position 64 for support while exiting the vehicle 26 and thereby apply an excessive load. As a second example, a child might unwittingly or intentionally rest his or her arms and head on the forward wall 80 of the glove box bin 30 in the fully open position 64 and thereby apply an excessive load. As a third example, a person may place a suitcase or other cargo item onto the forward wall 80 of the glove box bin 30 in the fully open position 64 while loading the vehicle 26. The suitcase or cargo item might exert an excessive load on the first and second downstops 40, 44.

In the three examples, the excessive load may be of such a magnitude that the first and second downstops 40, 44 break and a failure mode of the glovebox in a fully open position 64 results because the first and second downstops 40, 44 are no longer able to retain the bin 30 in an unsupported fully open position 64. In various aspects, a failure mode that makes the bin 30 unusable in an unsupported fully open position 64 may result if one of the first and second downstops 40, 44 breaks. The term unsupported fully open position 64 refers to the glovebox in the fully open position 64 with one or both of the first and second downstops 40, 44 broken such that the bin 30 cannot remain in the fully open position 64 without passenger or other external support. It is therefore desirable to have a glovebox interlock system 48 that includes a downstop 40 with first brace 86 and second brace 88 (FIGS. 5-6, 8-12) that strengthens the downstop 40 in the reinforced position when an excessive load is applied to the forward wall 80 of the bin 30 in the fully open position 64.

Figure 4:
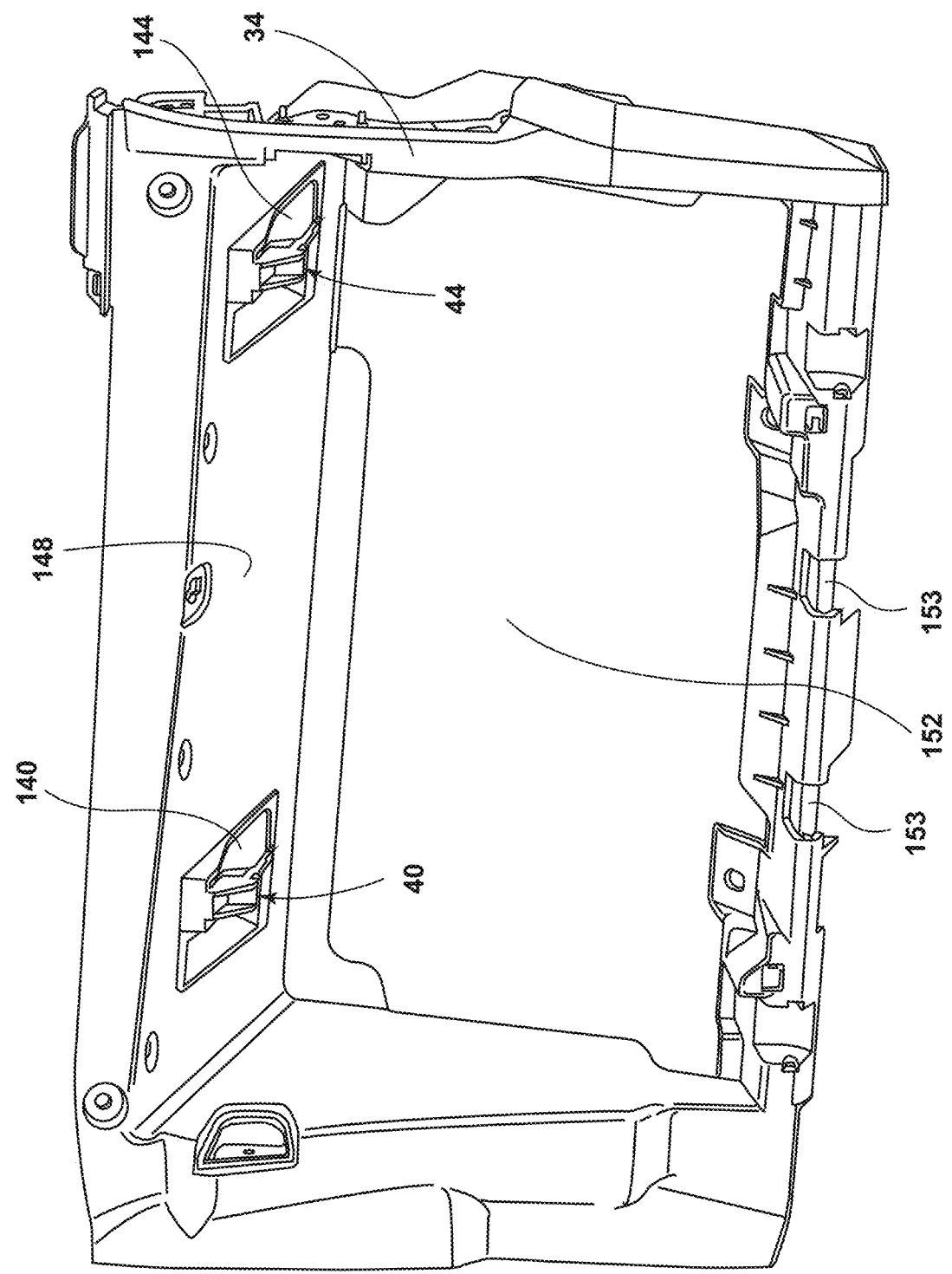
FIG. 4 is a perspective view of a frame of a glovebox with downstops integral to the frame.
Figure 5:
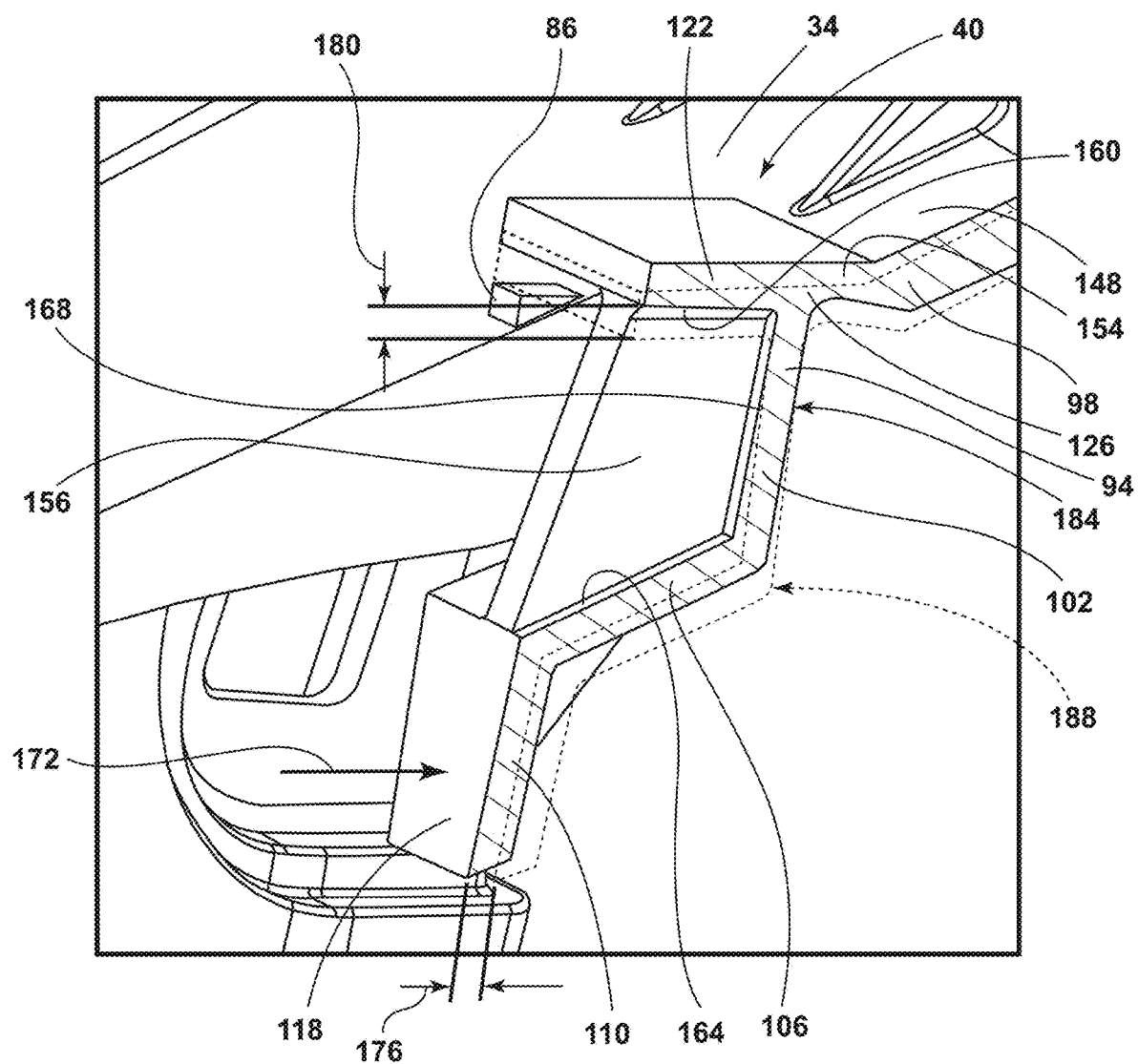
FIG. 5 is a rear perspective cutaway view of a portion of the frame with a downstop.

Referring to FIG. 3, the glove box assembly 10 is shown with the bin 30 in the fully open position 64. The bin 30 includes a forward wall 80 and a rear wall 90. The bin 30 rotates about a pivot point 92 in the frame 34. The downstop 40 includes a first flange 94 and a second flange 98. The first flange 94 extends downward from the recess 140 of the frame 34 (FIGS. 4-5). The second flange 98 extends from a ceiling 148 of the frame 34 and along the ceiling 148 of the frame 34.

Referring to FIGS. 3, 5, and 8-13, the first flange 94 includes a first segment 102, a second segment 106, and a third segment 110. The first segment 102 of the first flange 94 extends from the second flange 98 to a second segment 106 of the first flange 94. The second segment 106 of the first flange 94 connects the first segment 102 and the third segment 110. A third segment 110 of the first flange 94 extends from the second segment 106 and can be substantially parallel to a first segment 102 of the first flange 94. A top portion 114 of the rear wall 90 of the bin 30 is disposed against the rear surface 118 of the third segment 110 of the first flange 98 to hold the bin 30 in the fully open position 64 and the reinforcing position 68. The second flange 98 of the downstop 40 includes an interlock feature 122. The interlock feature 122 is positioned above the first and second braces 86, 88. The interlock feature 122 extends beyond the intersection 126 between the first flange 94 and the second flange 98 and towards the dashboard 14. In FIG. 3, the bin 30 is shown in a reinforcing position 68 and a removal position 130. An overrotated position 134 of the bin 30 is typically beyond the fully open position 64. The overrotated position 134 of the bin 30 typically includes the removal position 130.

With reference to FIG. 4, a front perspective view of the frame 34 is shown. A first downstop 40 and a second downstop 44 are disposed in respective first and second recesses 140, 144 in the ceiling 148 of the frame 34. The frame 34 includes an opening 152 for receiving the bin 30. The bin 30 is pivotably coupled to the frame 34 at pivot point 92 (FIG. 3). The frame 34 includes a shaft 153 about which the bin 30 rotates.

With reference to FIG. 4A, an embodiment of the frame 34 is shown with first and second downstops 40a, 40b extending from the dashboard 14 and into and through the first and second recesses 140, 144 in the ceiling 148 of the frame 34.

Figure 11:
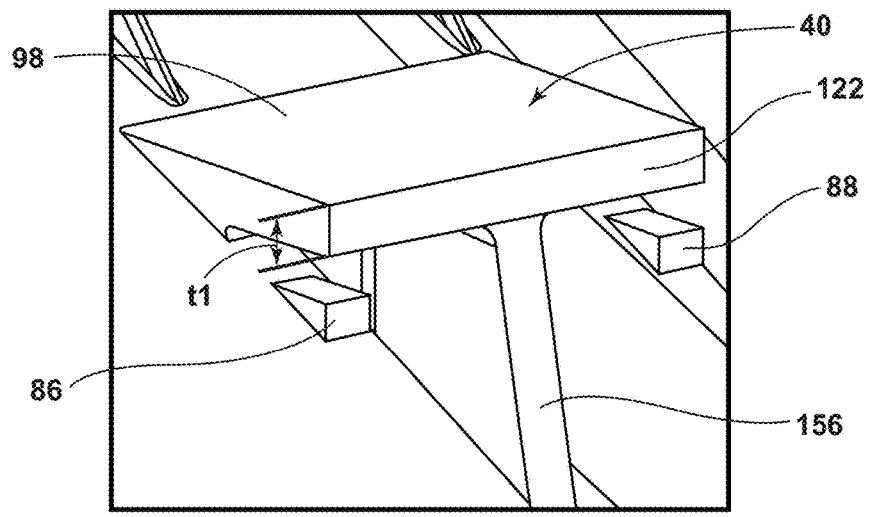
FIG. 11 is a rear perspective view of the downstop.
Figure 12:
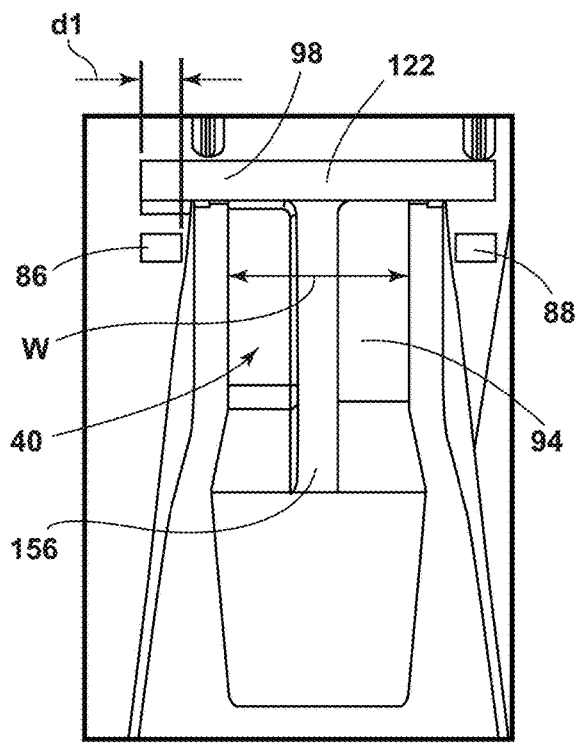
FIG. 12 is a rear elevational view of the downstop.
Figure 13:
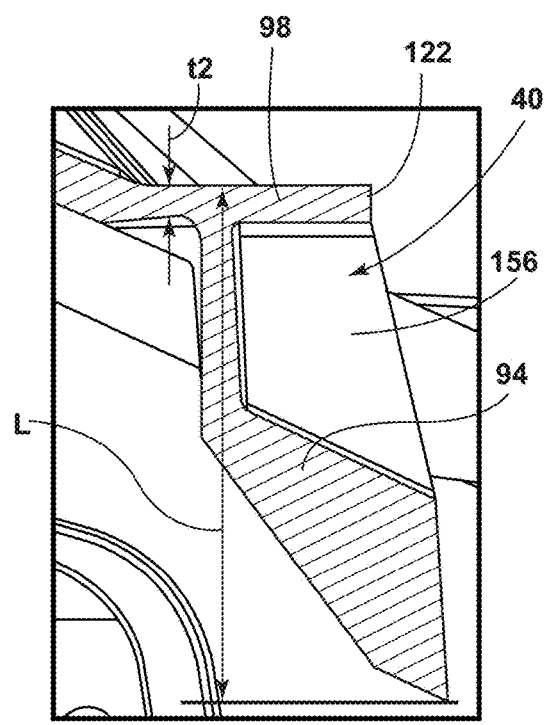
FIG. 13 is a side elevational view of the downstop.

With reference to FIG. 5, a cutaway rear view of the a downstop 40 is shown. The downstop 40 includes the first flange 94 and the second flange 98. The downstop 40 includes a base 154. With reference to FIGS. 11-13, the thickness $t_2$ at the base 154 may be adjusted to optimize the mechanical properties of the downstop 40. The second flange 98 extends from the ceiling 148 of the frame 34 in a direction along the ceiling 148 of the frame 34. The second flange 98 includes an interlock feature 122 that extends beyond the intersection 126 of the first flange 94 and the second flange 98. In the depicted cutaway view, the interlock feature 122 is depicted above a first brace 86. The first flange 94 includes the first segment 102, the second segment 106, and the third segment 110. In the depicted aspect, a ridge 156 extends from the bottom 160 of the interlock feature 122 to the top of the second segment 106 and to the rearward facing wall 168 of the first segment 102. The ridge 156 strengthens the downstop 40. When the downstop 40 is in a blocking position 184 and a resultant force 172 from an excessive load is applied to the rear surface 118 of the third segment 110 of the first flange 94, then the downstop 40 moves to a reinforced position 188. In the reinforced position 188, the first flange 94 moves a first distance 176 from the blocking position 184 to the reinforced position 188, and the second flange 98 moves a second distance 180 from the blocking position 184 to the reinforced position 188. More specifically, in the reinforced position 188, the third segment 110 of the first flange 94 moves a first distance 176 from the blocking position 184 to the reinforced position 188, and the interlock feature 122 of the second flange 98 moves a second distance 180 from the blocking position 184 to the reinforced position 188. The downstop 40 is typically in the blocking position 184 when the bin 30 is in the fully open position 64.

Figure 6:
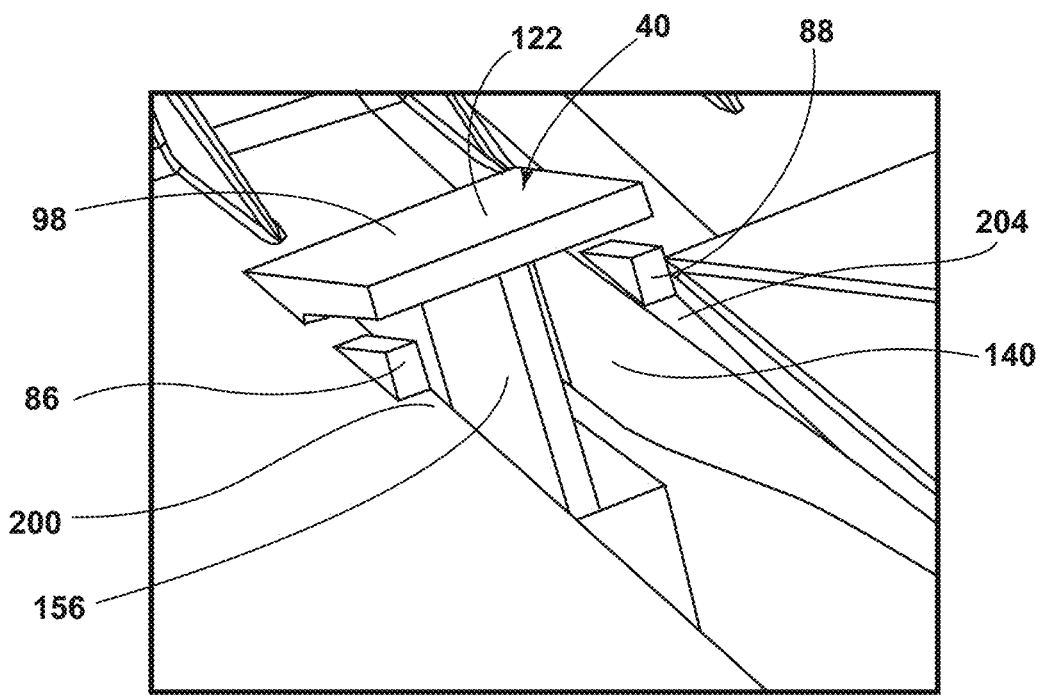
FIG. 6 is a rear perspective view of a portion of the ceiling of the frame with a downstop.

Referring to FIG. 6, a rear view of the first downstop 40 protruding from the first recess 140 in the frame 34 is shown. The ridge 156 is disposed in a substantially transverse substantially centered position below the interlock feature 122. The first brace 86 and the second brace 88 are disposed on opposing first and second sides 200, 204 of the recess 140 and below the interlock feature 122.

Figure 7:
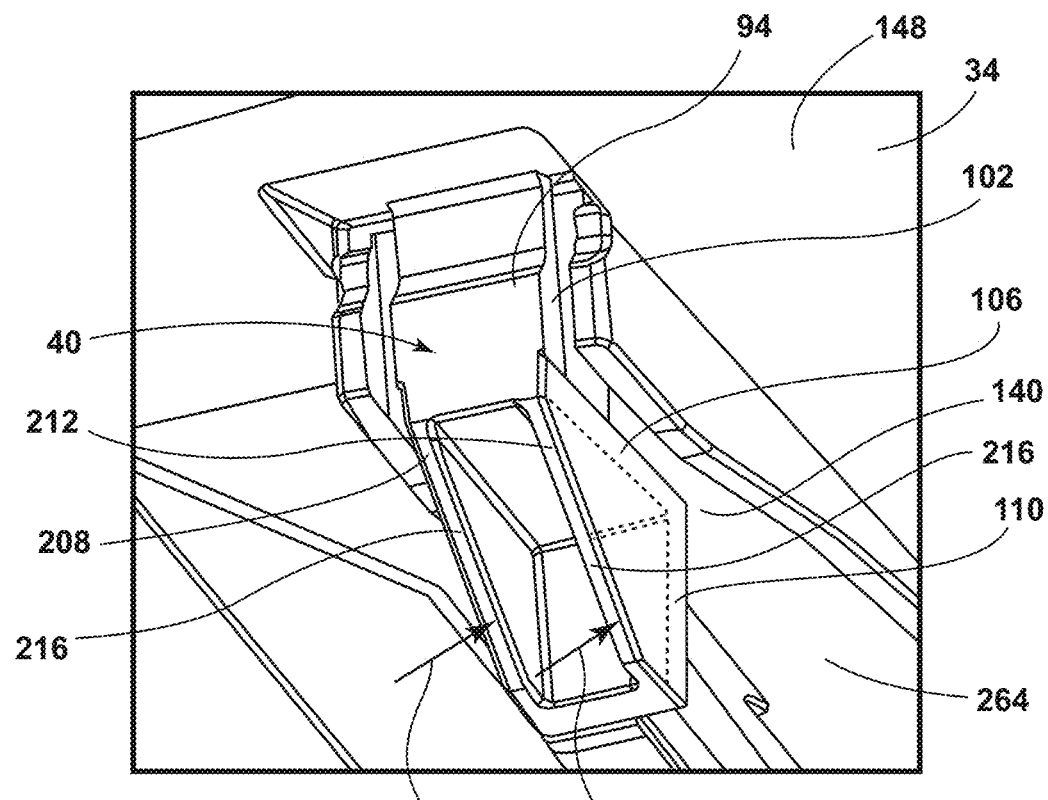
FIG. 7 is a front perspective view of a portion of the ceiling of the frame with a downstop.

FIG. 7 shows a front perspective view of a ceiling 148 of the frame 34 with the downstop 40. The downstop 40 is disposed in a recess 140 of the ceiling 148. The downstop 40 includes the first segment 102, the second segment 106, and the third segment 110 of the first flange 94. First and second sidewalls 208, 212 extend between the second segment 106 and the third segment 110 on opposing sides of the second segment 106 and the third segment 110. Referring to FIGS. 3, 4, and 7, the first and second sidewalls 208, 212 include slanted portions 216 along which the top portion 114 of the rear wall 90 of the bin 30 slides when the bin 30 is coupled to the shaft 153 of the frame 34 and rotated into the frame 34.

Referring to FIGS. 1-13, in various aspects, a vehicle glovebox assembly 10 includes a bin 30 rotationally operable within a frame 34 and a downstop 40 defined within the frame 34. The downstop 40 in a blocking position 184 engages the bin 30 to define a fully open position 64 of the bin 30, and the downstop 40 is operable to a release position 230 that defines rotation of the bin 30 beyond the fully open position 64. A reinforced position 188 of the downstop 40 is defined by an outward deflection of the first flange 94 of the downstop 40 of a first distance 176 from the blocking position 184 and a downward deflection of the second flange 98 of the downstop 40 of a second distance 180 from the blocking position 184. Specifically, to achieve the reinforced position 188 of the downstop 40, the third segment 110 of the first flange 94 moves a first distance 176 from the blocking position 184 to the reinforced position 188, and the interlock feature 122 of the second flange 98 moves a second distance 180 from the blocking position 184 to the reinforced position 188.

Figure 8:
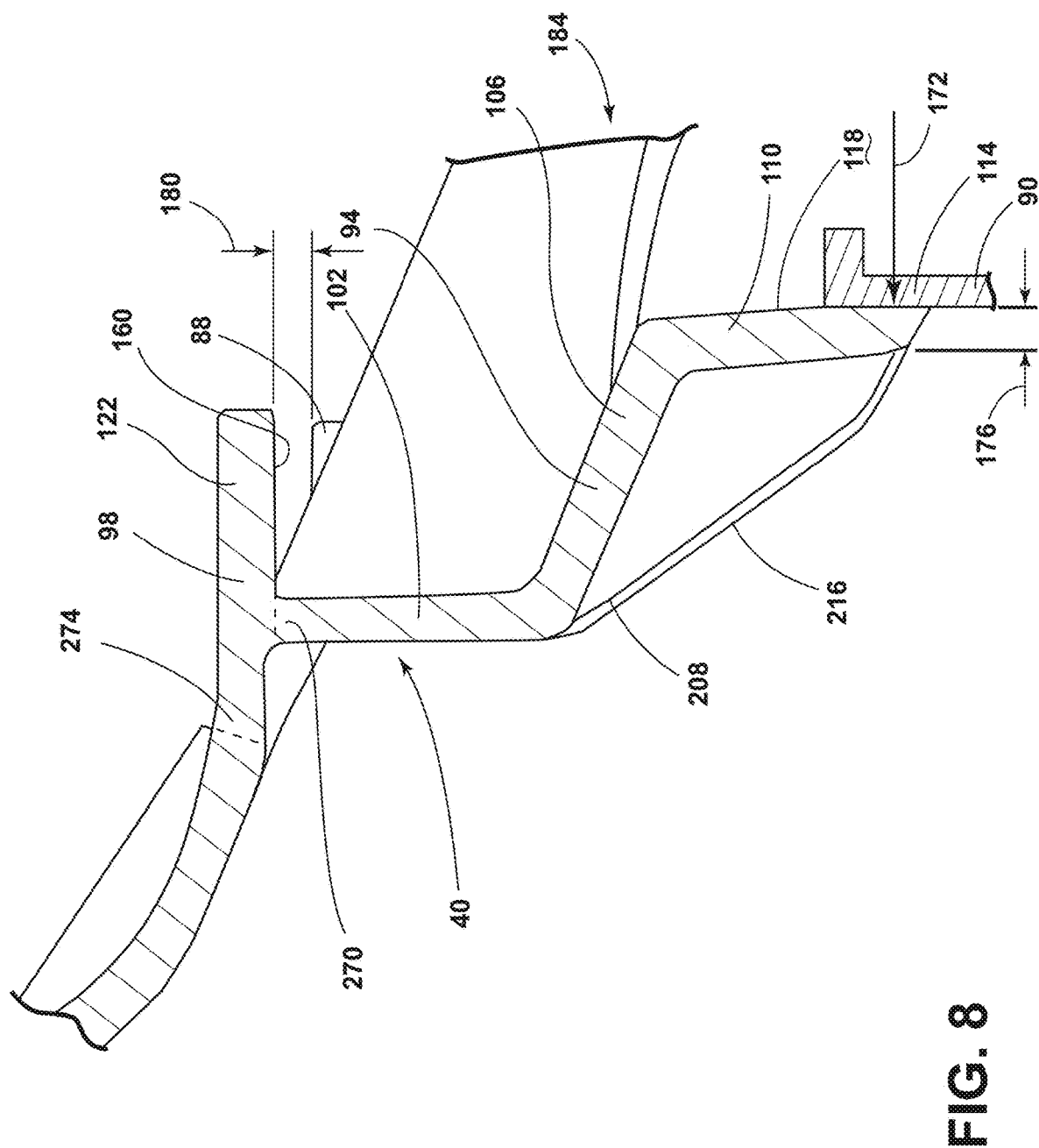
FIG. 8 is an exploded view of a portion of the glovebox assembly of FIG. 3 showing the downstop in a blocking position.
Figure 9:
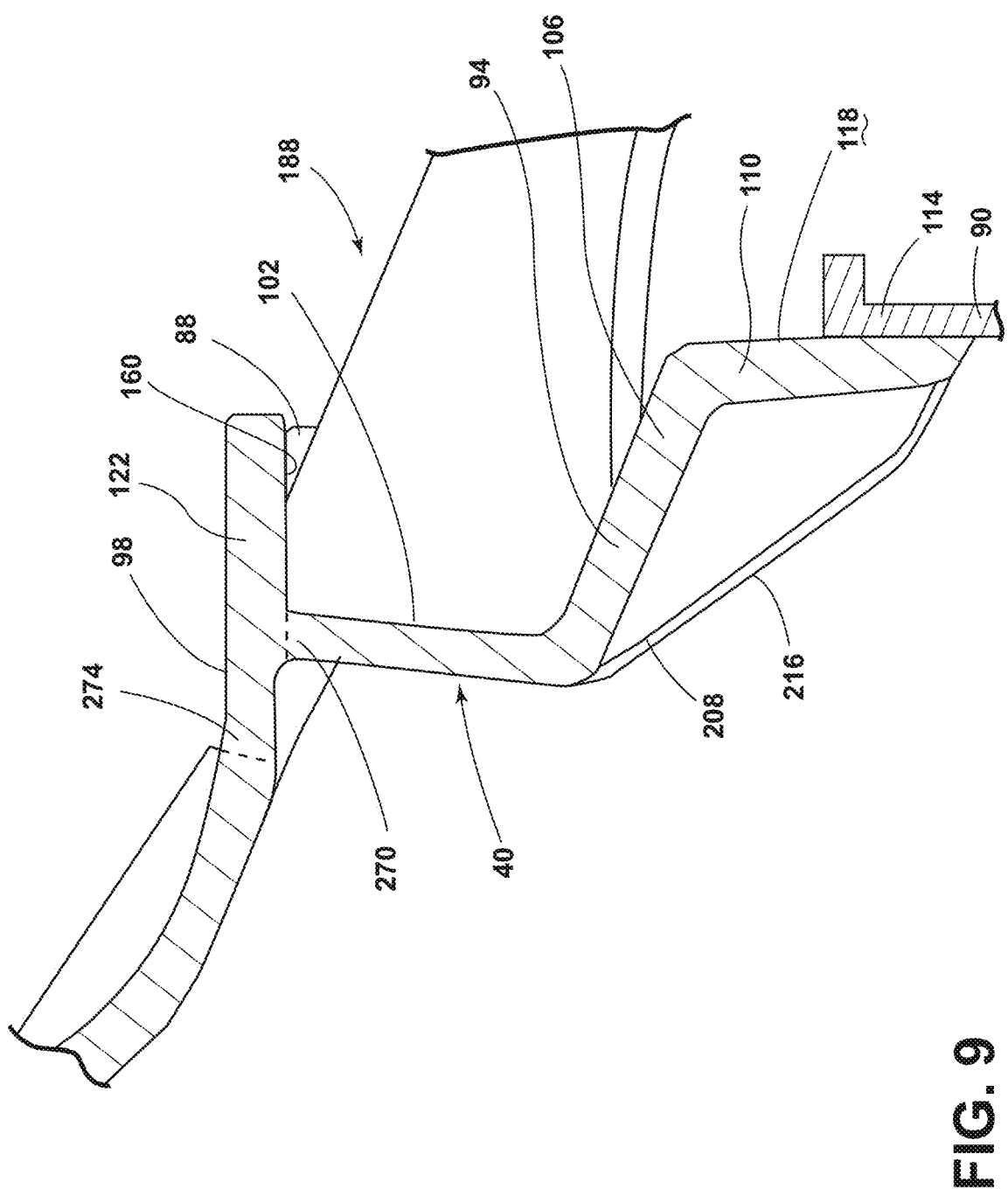
FIG. 9 is an exploded view of a portion of the glovebox assembly of FIG. 3 showing the downstop in a reinforced position.
Figure 10:
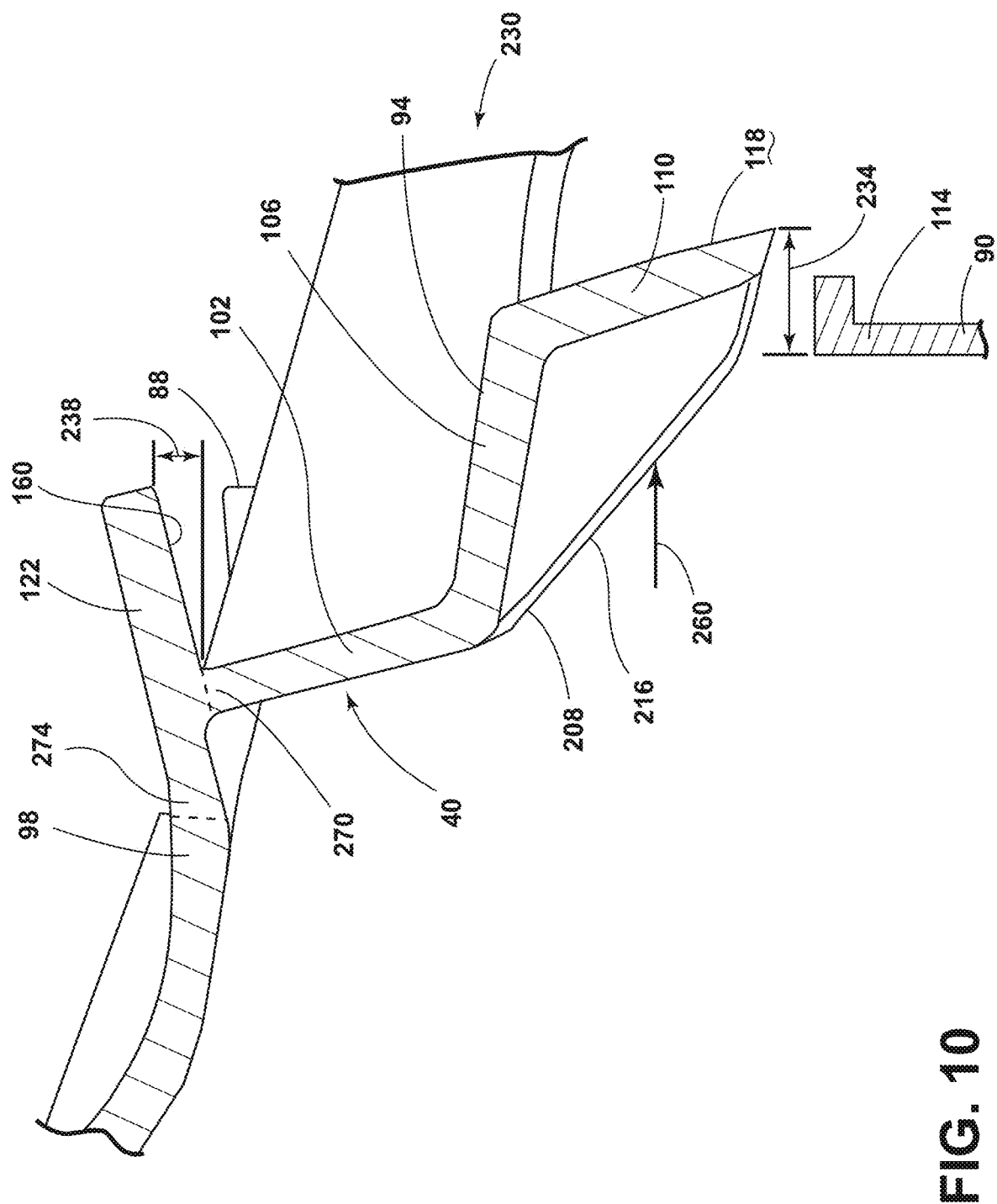
FIG. 10 is an exploded view of a portion of the glovebox assembly of FIG. 3 showing the downstop in a release position.

As exemplified in FIGS. 8-10, the release position 230 of the downstop 40 is defined by an inward deflection of the first flange 94 of a third distance 234 from the blocking position 184, and an upward deflection of the interlock feature 122 a fourth distance 238 from the blocking position 184. Specifically, to achieve the release position 230 of the downstop 40, the third segment 110 of the first flange 94 moves a third distance 234 from the blocking position 184, and the interlock feature 122 moves a fourth distance 238 from the blocking position 184.

In various aspects, the reinforcing position 68 of the bin 30 is defined by a downward force 84 applied to a forward facing wall of the bin 30 when the bin 30 is in the fully open position 64. In various aspects, the downward force 84 may be identified as an excessive load or a customer abuse load. In various aspects, the frame 34 includes a first brace 86 and a second brace 88, the second flange 98 includes an interlock feature 122, and the first brace 86 and the second brace 88 support the interlock feature 122 in the reinforced position 188 and limit the outward deflection of the first flange 94 to the first distance 176. When the bin 30 is in a fully open position 64, then a rear wall 90 of the bin 30 engages a rear surface 118 of the third segment 110 of the first flange 94. When the bin 30 is in the reinforcing position 68, then the rear wall 90 of the bin 30 engages a rear surface 118 of the third segment 110 of the first flange 94, and a bottom surface 160 of the interlock feature 122 engages the first brace 86 and the second brace 88.

The downstop 40 is typically moved to the reinforced position 188 upon application of a first force (resultant force 172, FIGS. 5, 8) having a first magnitude upon the downstop 40 and in a direction substantially normal to and toward a rear surface 118 of the third segment 110 of first flange 94. The downstop 40 is typically moved to the release position 230 after application of a second force 260 (FIGS. 7, 10) having a second magnitude upon a front surface (slanted portions 216 of first and second sidewalls 208, 212 in FIGS. 7 and 10) of the first flange 94 and in a direction generally opposed to the first force 172 and toward an interior 264 of the frame 34. In various aspects, the first magnitude of the first force 172 is greater than the second magnitude of the second force 260.

With reference to FIGS. 8-10, the downstop 40 is shown in a blocking position 184 (FIG. 8), a reinforced position 188 (FIG. 9), and a release position 230 (FIG. 10). The first flange 94 is typically a substantially rigid member that rotates about a first living hinge 270. The second flange 98 is typically a substantially rigid member that rotates about a second living hinge 274. The second living hinge 274 is typically disposed proximate a ceiling 148 of the frame 34. In various aspects, the second living hinge 274 may be located at the base 154.

The first flange 94 typically includes a first segment 102, a second segment 106, and a third segment 110. The first segment 102 of the first flange 94 is substantially transverse to the second flange 98. First sidewall 208 typically extends between the second segment 106 of the first flange 94 and the third segment 110 of the first flange 94.

With reference to FIG. 10, when the downstop 40 is in the release position 230, the first flange 94 is at least partially disposed within the interior of the frame 34, and the bin 30 is adapted to bypass the frame 34 to define a removal position 130 of the bin 30. The bin 30 is removable from the frame 34 in the removal position 130. The first flange 94 moves a third distance 234 from the blocking position 184 to the release position 230. The second flange 98 moves a fourth distance 238 from the blocking position 184 to the release position 230.

Referring to FIGS. 3, 4A, and 5-10, in various aspects, the housing (frame 34) may be disposed within a dashboard 14. A bin 30 is rotationally operable within the housing (frame 34). First and second downstops 40a, 44a are integral to the dashboard 14 and protrude into the bin 30 through first and second recesses 140, 144 in the frame 34. First and second downstops 40a, 44a are operable between a blocking position 184 that engages the bin 30 in a fully open position 64 and a reinforced position 188 wherein a first flange 94 of the downstop 40 operably engages the bin 30 and a second flange 98 of the downstop 40 operably engages first and second braces 86, 88 of the housing (frame 34) for limiting over rotation of the bin 30.

Referring to FIGS. 5-10, the first flange 94 may be selectively and alternatively positionable in release 230, blocking 184, and reinforced 188 positions relative to the bin 30, and the second flange 98 is selectively positionable in release 230, blocking 184, and reinforced 188 positions relative to the first and second braces 86, 88.

Referring to FIGS. 11-13, the downstop 40 may be optimized by varying design aspects of the downstop 40. The design aspects include the down stop length L, width w, thickness ti at the interlock feature 122, thickness $t_2$ at the base 154, and overlap distance $d_1$ of the interlock feature 122 and the brace 86. The downstop 40 length L, width w, and thickness $t_2$ at the base 154 of the downstop 40 may be optimized to adjust the force (for example, the force depicted by arrow 260, FIGS. 7 and 10) exerted on the downstop 40 in the release position 230. The customer abuse load (for example, the force depicted by arrow 84, FIGS. 2-3) that the downstop 40 can absorb without breaking or entering into a failure mode can be fine-tuned by optimizing the downstop 40 thickness $t_1$ and the overlap distance $d_1$.

In various aspects, the frame 34, the first downstop 40, the second downstop 44, the first brace 86, and the second brace 88 form an integral molded part.

While the first and second downstops 40, 44 are shown, the interlock system 48 may include only the first downstop 40 or one or more downstops in addition to the first and second downstops 40, 44.

According to various aspects, it is contemplated that the bin 30, the frame 34, and the dashboard 14 can be made of various materials that can include, but are not limited to, plastic, various polymers, composite materials, combinations therefor, and other similar materials.

The interlock system disclosed herein may be used within various storage compartments of a vehicle 26. Such storage compartments may include, but are not limited to, glove box assemblies, console compartments, ashtrays, cupholders, rear storage compartments, and various other storage compartments within the vehicle 20.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle glovebox, comprising:
   a bin rotationally operable within a housing; and
   a downstop defined within the housing, wherein
      the downstop in a blocking position engages the bin to define a fully open position of the bin, wherein
      the downstop is operable to a release position that defines rotation of the bin beyond the fully open position, wherein the housing comprises a frame, wherein
      the downstop is attached to the frame, wherein the downstop comprises a first flange and a second flange, and wherein the second flange is transverse to the first flange.

2. The vehicle glovebox of claim 1, wherein a reinforced position of the downstop is defined by an outward deflection of the first flange of the downstop of a first distance from the blocking position and a downward deflection of the second flange of the downstop of a second distance from the blocking position.

3. The vehicle glovebox of claim 2, wherein the release position of the downstop is defined by an inward deflection of the downstop of a third distance from the blocking position.

4. The vehicle glovebox of claim 2, wherein the reinforcing position of the bin is defined by a downward force applied to the bin when the bin is in the fully open position.

5. The vehicle glovebox of claim 4, wherein the frame includes a brace, the second flange includes an interlock feature, and the brace supports the interlock feature in the reinforced position and limits the outward deflection of the first flange to the first distance.

6. The vehicle glovebox of claim 5, wherein the first flange engages a back wall of the bin in the blocking position when the bin is in the fully open position and wherein, when the bin is in the reinforcing position, the first flange engages the bin and the interlock feature of the second flange engages the brace.

7. The vehicle glovebox of claim 5, wherein a back wall of the bin engages a rear surface of the first flange in the fully open position and the reinforcing position and wherein a bottom surface of the interlock feature engages the brace in the reinforcing position.

8. The vehicle glovebox of claim 4, wherein the downstop is moved to the reinforcing position upon application of a first force upon the downstop and in a direction substantially normal to and toward a rear surface of the first flange, wherein the first force has a first magnitude, and wherein the downstop is moved to the release position upon application of a second force upon a front surface of the first flange and in a direction generally opposed to the first force and toward an interior of the frame, wherein the second force has a second magnitude, and wherein the first magnitude is greater than the second magnitude.

9. The vehicle glovebox of claim 4, wherein the first flange is a substantially rigid member that rotates about a first living hinge and wherein the second flange is a substantially rigid member that rotates around a second living hinge.

10. The vehicle glovebox of claim 9, wherein the second living hinge is disposed proximate a ceiling of the frame.

11. The vehicle glovebox of claim 4, wherein a ridge extends from the first flange to the second flange.

12. The vehicle glovebox of claim 4, wherein, when the downstop is in the release position, the first flange is at least partially disposed within the interior of the frame and the bin is adapted to bypass the frame to define a removal position of the bin, wherein the bin is removable from the frame in the removal position.

13. A vehicle, comprising:
a housing disposed within a dashboard;
a bin rotationally operable within the housing; and
a downstop integral to the housing and protruding into the bin, wherein the downstop is operable between a blocking position that engages the bin in a fully open position, a release position wherein the bin is selectively removable from the housing, and a reinforced position wherein a first flange of the downstop operably engages the bin and a second flange of the downstop operably engages a brace of the housing for limiting over rotation of the bin, wherein the housing comprises a frame, and wherein the downstop is integral to the frame, and wherein the reinforced position of the downstop is defined by an outward deflection of the first flange of a first distance from the blocking position and a downward deflection of the second flange of a second distance from the blocking position, wherein the release position of the downstop is defined by an inward deflection of the first flange of a third distance from the blocking position, and wherein the third distance from the blocking position is greater than the first distance from the blocking position.

14. A glovebox, comprising:
a housing;
a bin having an interior; and
a downstop protruding from the housing into the interior, wherein the bin is rotationally coupled to the housing, and wherein the downstop comprises a first flange and a second flange, wherein the first flange is selectively and alternatively positionable in release, blocking, and reinforced positions relative to the bin, and wherein the second flange is selectively and alternatively positionable in release, blocking, and reinforced positions relative to a brace of the housing, wherein the housing comprises a frame including the downstop and the brace, and wherein the frame, the downstop, and the brace are an integrally molded part.

* * * * *